US 8,099,490 B2

(12) United States Patent
Deakin (10) Patent No.: US 8,099,490 B2
(45) Date of Patent: Jan. 17, 2012

(54) SERVER FOR DETERMINING AND STORING MOBILE DEVICE CAPABILITY DATA

(75) Inventor: Ian Deakin, County Cork (IE)

(73) Assignee: Telcordia Operations Limited (IE)

( * ) Notice: Subject to any disclaimer, the term of this patent is extended or adjusted under 35 U.S.C. 154(b) by 77 days.

(21) Appl. No.: 11/347,433

(22) Filed: Feb. 6, 2006

(65) Prior Publication Data

US 2006/0129638 A1    Jun. 15, 2006

Related U.S. Application Data

(63) Continuation of application No. PCT/IE2004/000108, filed on Aug. 9, 2004.

(30) Foreign Application Priority Data

Aug. 7, 2003    (IE) .................................. 2003/0584

(51) Int. Cl.
G06F 15/173    (2006.01)
(52) U.S. Cl. ........................................ 709/224
(58) Field of Classification Search .................. 707/1, 3, 707/10; 709/217–219, 220, 221, 223, 224
See application file for complete search history.

(56) References Cited

U.S. PATENT DOCUMENTS

| | | | |
|---|---|---|---|
| 6,415,321 B1* | 7/2002 | Gleichauf et al. | 709/224 |
| 7,110,773 B1* | 9/2006 | Wallace et al. | 455/456.1 |
| 7,284,046 B1* | 10/2007 | Kreiner et al. | 709/223 |
| 7,567,810 B1* | 7/2009 | Overton | 455/456.3 |
| 2002/0022453 A1 | 2/2002 | Balog et al. | 455/41 |
| 2002/0119793 A1* | 8/2002 | Hronek et al. | 455/466 |
| 2002/0184197 A1* | 12/2002 | He et al. | 707/3 |
| 2002/0187781 A1* | 12/2002 | Furlong | 455/433 |
| 2003/0018767 A1* | 1/2003 | Chatani et al. | 709/223 |
| 2003/0028390 A1* | 2/2003 | Stern et al. | 705/1 |
| 2003/0046388 A1* | 3/2003 | Milliken | 709/224 |
| 2003/0065919 A1* | 4/2003 | Albert et al. | 713/168 |
| 2003/0088709 A1* | 5/2003 | Lin | 709/319 |
| 2004/0024867 A1* | 2/2004 | Kjellberg | 709/224 |
| 2004/0203759 A1* | 10/2004 | Shaw et al. | 455/433 |
| 2006/0104211 A1* | 5/2006 | Islam et al. | 370/252 |

FOREIGN PATENT DOCUMENTS

| | | |
|---|---|---|
| WO | WO01/78425 | 10/2001 |
| WO | WO02/095529 | 11/2002 |

OTHER PUBLICATIONS

Silberschatz, A., et al., "Operating System Concepts", sixth edition. New Jersey: John Wiley & Sons, Inc., Mar. 8, 2002 (see attached pages), pp. 3-6, 455, 463 and 466-467.*
iDec—the IMEI Detection System for consistent MMS quality, pp. 1-7, XP002304482, Polystar Instruments, Nov. 4, 2004.
Equipment Profile Register—Enable intelligent multimedia content download, pp. 1-2, XP002304482, 2004, Stratus Technologies.

* cited by examiner

Primary Examiner — Jeffrey Pwu
Assistant Examiner — Scott M Sciacca (57) ABSTRACT

A handset capability proxy server (1) automatically determines data concerning capabilities of mobile devices and links to users as the devices are used. Event handlers/filters (25, 26) listen to signalling and messaging traffic at different locations in a network. The filter (25, 26) filters out data not relevant to device capability. The handler accesses a RAM cache (37) to dynamically determine if there has been a capability change for a mobile device identifier. It transmits changes to a kernel (10) via a message bus (12). The kernel (10) manages a persistent database (41, 44) of consumer data and device capability data, and automatically notifies subscribed applications in real time.

9 Claims, 8 Drawing Sheets

SERVER FOR DETERMINING AND STORING MOBILE DEVICE CAPABILITY DATA

This is a continuation of PCT/IE2004/000108 filed 9 Aug. 2004 and published in English.

INTRODUCTION

1. Field of the Invention

The invention relates to mobile networks and mobile devices.

2. Prior Art Discussion

There is a very wide variety of types of mobile devices, each having its own capabilities in terms of service capability, display resolution, colour depth, and multi-media functionality. This creates compatibility problems for content providers and network operators.

Mobile application providers and even operators are disadvantaged by the current situation where push applications cannot determine the handset capability. For example, SMS logo graphics and ringtones are very specific to the handset manufacturer and model, and indeed an incorrectly selected ringtone or logo cannot be detected until the content is received at the handset.

Another problem encountered by network operators is non-detection of positive handset churn. When a consumer buys a new mobile device the operator has to enable the appropriate services in the network and the handset must be configured to connect to these new services.

In this specification, the terms "device" and "handset" are used interchangeably. The term "ASP" or "subscribed application" is intended to mean subscribed applications, whereas "consumer" and "user" means a person in possession of a mobile device.

The invention addresses these problems.

SUMMARY OF THE INVENTION

According to the invention, there is provided a mobile device capability server comprising:
- an input interface for receiving mobile network data in real time;
- a processor for automatically determining mobile device capability data from said network data; and
- an application interface for making said capability data available to applications in real time.

In one embodiment, the network interface listens to network traffic.

In one embodiment, the network interface listens to signalling traffic.

In one embodiment, the network interface receives mobile network device authentication data.

In one embodiment, the network interface comprises a filter for identifying items of the received network data which is relevant to mobile device capability.

In another embodiment, the filter identifies items of the received network data applicable to a group of users.

In one embodiment, the filter identifies items of the received network data by comparisons with a list of users.

In one embodiment, the processor comprises at least one event handler for performing initial processing of relevant network data associated with a mobile device.

In one embodiment, the initial processing is event-based, one event being associated with a user and device combination.

In a further embodiment, the event handler comprises a cache of existing device capability data linked with users, and the initial processing comprises determining if there is a change in capability of a mobile device of a user.

In one embodiment, the processor further comprises a kernel, and a message bus for communication between the kernel and each event handler.

In one embodiment, the event handler transmits mobile device capability change data to the kernel via the message bus, the kernel manages a database of current capability data, and the kernel automatically updates said data upon receipt of said change data.

In one embodiment, the kernel transmits the updates to each event handler, and each event handler automatically updates its cache so that all caches and the database are synchronised.

In one embodiment, said update is broadcast on the message bus.

In one embodiment, the network interface detects correspondence between a device identifier and a user identifier in one network message.

In one embodiment, the network interface receives CDR data transmitted by a network element.

In one embodiment, the network interface receives data from an API of a network element.

In another embodiment, the kernel manages a user database and a device database, and automatically maintains links between users and their device capability data.

In one embodiment, the processor automatically notifies subscribed applications of capability changes.

In one embodiment, the kernel comprises a rule base of logic for controlling notifications.

In one embodiment, the server further comprises a message bus for communication of capability data between the kernel and the application interface.

In one embodiment, the kernel uses the message bus by broadcasting a message onto the message bus, and adapters of the application interface recognise relevant messages.

In one embodiment, the adapters recognise relevant messages by listening on particular channels In one embodiment, the processor tracks usage of different mobile devices by the same user.

In one embodiment, the application interface allows user self-provisioning to allow or disallow external application queries.

In one embodiment, the processor detects mobile device usage patterns for suspected fraudulent usage, and automatically transmits a message to a network entity if a potentially fraudulent usage pattern is detected.

In one embodiment, the processor allows applications to subscribe to be notified when a specific user changes capabilities.

In one embodiment, the processor restricts notifications to data based on pre-configured authorisation properties.

In one embodiment, the processor allows applications to query specific user changes capabilities.

In one embodiment, the queries are restricted to data based on pre-configured authorisation properties.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
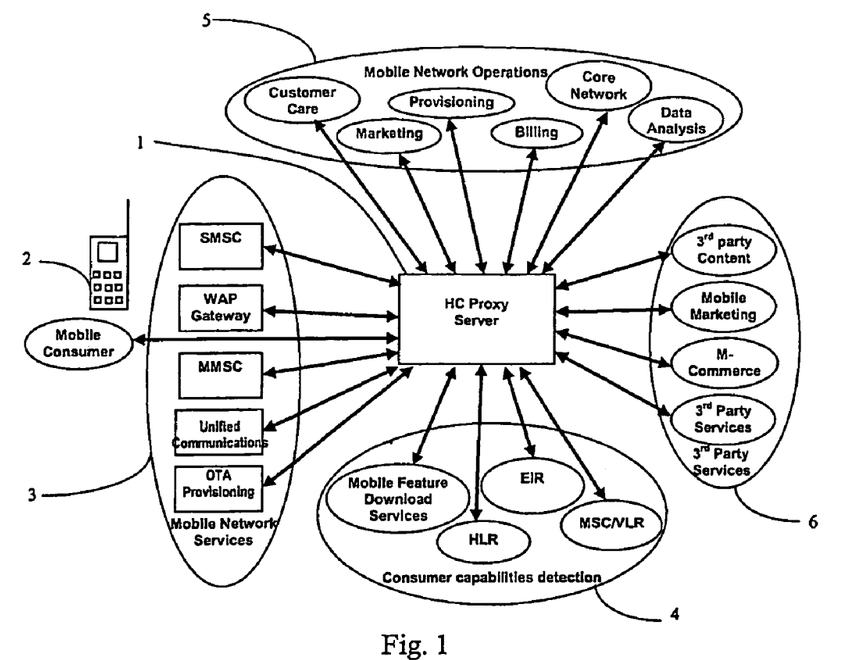
FIG. 1 is a context diagrammatic representation of a server of the invention and its operating environment.

Referring to FIG. 1 a server 1 of the invention resides in a mobile network. It communicates with the network infrastructure to detect the presence of a mobile device 2 at authentication. It communicates with core network signalling elements 3 for real time automatic detection of device capabilities. It also communicates with mobile device feature download servers 4 in real time to detect the presence of additional capability features on the mobile device 2 when they are downloaded onto the device 2. Within the network, it communicates with the mobile operator's operational support services 5 in real time including customer care servers and automatic provisioning servers. It also communicates with external servers 6 for provision of third party content and applications including direct marketing, ringtone/logo downloading, and games/applications to the mobile devices 2. For device capability queries from servers 5 or 6 it acts as a proxy server, avoiding the need for direct queries to the devices themselves. It may therefore be referred to as a (handset capability, "HC") proxy server.

The server 1 provides real time device capability notifications to any registered application, for a consumer's handset type and capabilities immediately when the consumer's mobile handset is switched on. This is an unobtrusive process not requiring the mobile user to initiate any process or for the device to be constantly polled. The data may be derived from listening to network traffic in real time, or by receiving data from a network element immediately after it is received (e.g. CDR data).

Figure 2:
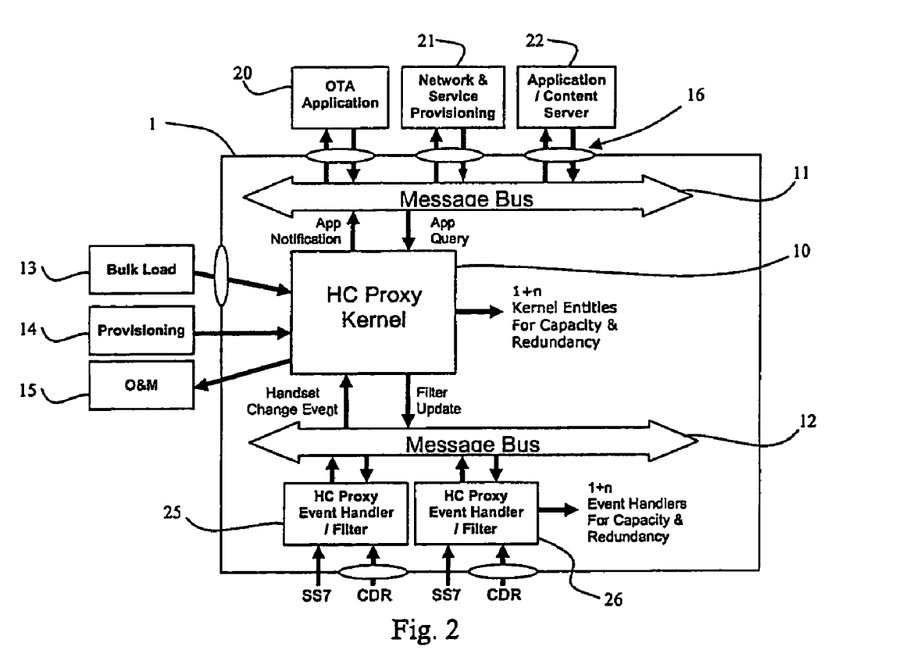
FIG. 2 is a diagram showing framework of the server.

Referring to FIG. 2 the server 1 comprises a kernel 10 linked with message buses 11 and 12. It communicates separately from the buses 11 and 12 with bulk load 13, provisioning 14, and O&M 15 servers. The message bus 11 links the kernel 10, via plug-in adapters 16, with an OTA application 20, network and service billing servers 21, and application/content servers 22. The message bus 12 links it with event handlers/filters 25 and 26. The buses 11 and 12 are separate Java Messaging Service (JMS) buses.

In more detail, the kernel 10 performs the core functions of the server 1 including management of a database of customers, handset profiles, and application profiles. It executes decision logic to dynamically apply filters to the event handlers and notification of consumer characteristics to ASP applications. It applies the filters by dynamically updating the cache so that it is synchronised with its own database. The kernel database is at the core of the server, maintaining a full inventory of every device on the mobile operator's network including the details of individual device capabilities for each consumer. The information stored in the database includes:

- The phone number (MSISDN) of each handset on the network, with current and list of device types used by this number over a predefined time period.
- A list of additional downloaded applications to each handset, beyond the basic features of the manufactured device, i.e. Video Streaming.
- For each phone number (MSISDN) a list of subscribed applications and services which should be notified automatically if the device is changed.
- List of device manufacturer names, models and the list of service capabilities/properties for each, including SMS, WAP, MMS, GPRS, Screen Size, Colour, File formats for Graphics, Music, Video.
- A general list of subscribed applications and services which will always be notified automatically by the HC proxy server 1.
- A list of applications which have specific permissions to query capabilities, subscribe/unsubscribe for notification of capabilities on individual consumers.
- Handset movement tracking for fraud detection and consumer behavour pattern analysis.
- Statistical data on handset volumes, usage, churn rates per type across the total network.

The kernel allows a mobile consumer to check through the provisioning interface and check the current settings in the database for their mobile number and display information on applications that have registered to receive information about their capabilities. The consumer can configure their profile to allow or disallow external application query and/or subscribe to receive capability information about their mobile. The configuration of the consumer profile is via a WEB interface.

The event handler/filters 25 and 26 perform real time, high performance, volume processing of network events which identify handset change by a consumer. This role is to filter and mediate only relevant events, which relate to a handset change. Essentially, the handlers/filters 25 and 26 non-intrusively listen in real time to signalling traffic and/or call event data at certain network nodes. They filter out non-relevant events and process the relevant data by accessing a cache of last recorded consumer handset data and pass detected changes to the kernel 10 for processing. In this embodiment each handler/filter is capable of handling approximately 25,000 cache-accessing events per second. There is one cache per handler/filter, and it is of c. 2 GB RAM size. It therefore allows the server 1 to achieve a high performance. There is a minimum of two handlers/filters, for redundancy.

Each handler/filter can be configured to search for only specific groups of consumers to be processed by the server. Examples of these groups are consumers of a particular operator only, roaming-only consumers, specific roaming network consumers or any combination of these groups. This filter is (in GSM) based on the MNC (mobile network code) and MCC (mobile country code) of the consumer IMSI identity.

The filter can be configured to search for a specific list of mobile consumer identities or a specific list of device identities. If the filter detects a consumer or device on these lists it sends the events immediately to the kernel 10 for processing. This is used to track consumers and handsets, which have been associated with fraud or required for fault detection.

In each handler/filter an event arises for each user-device association detected.

The message bus 12 is also used by the kernel 10 for routing updates to the handlers/filters 25 and 26. These updates are used by the handlers/filters to update the caches. The updates are broadcast by the kernel 10 onto the message bus 12. Each filter listens in on the broadcast to apply updates into the cache.

On the other side, the kernel 10 uses the capability data of its database to push notifications to various subscribed application services. This is performed via an application interface comprising the plug-in adapters 16 linked with the message bus 11. The adapters 16 have a common JMS API on the side of the message bus 11, and a particular protocol on the application server side which is compatible with the relevant application server. Each adapter 16 listens on the message buss 11 for a particular channel broadcast by the kernel. There is one adapter for each application, and each adapter is assigned a channel to listen on. There may be multiple adapters listening on one particular channel, each channel being assigned to a profile rather than to an individual adapter. The kernel 10 includes both pre-configured rules and dynamically provisioned rules based on external application services subscribing to the server 1. Thus, some services are always notified, some are only notified if certain conditions are satisfied, and others are open for a range of applications to subscribe to.

The server 1 provides open API interfaces to allow integration with the operator network and service entities. The server 1 is scaleable to meet the performance demands of the specific installation and the specific characteristics of the handset change behaviour from the customer base. Depending on the specific functional demands of the server 1, the server 1 can be easily dimensioned by adding multiple entities to meet the specific requirements.

The adapters 16 provide an ASP (Application Service Provider) interface for the query and distribution of consumer handset capability information. The server 1 can have multiple instances of adapters for different logical ASP interfaces. Each logical ASP interface can be assigned to an individual external application. The application interface has three main functions:

Notifications—this is an asynchronous outbound event interface, providing 1-n number of notifications to the external ASP application. This interface communicates through the message bus 11 and adapters 16.

Query—this is a transactional request/response message flow. The ASP can request the capabilities for a given mobile number (in GSM a MSISDN or IMSI). The server 1 provides a response to the request based on the security permissions for the ASP logical interface, the availability of the data for the given mobile number.

Figure 11:
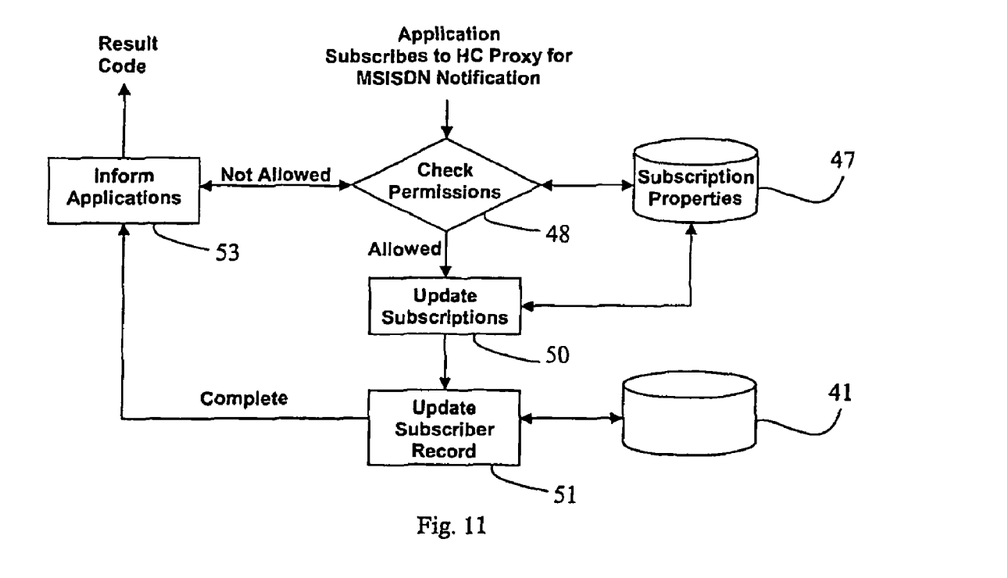
FIG. 11 is a process flow diagram showing how the server manages subscription by external applications, to be notified about changes on mobile consumers.

Subscribe/Unsubscribe—this is a transactional request/response message flow. The ASP can request the server 1 to register (subscribe) for notifications of consumer's capability change information. The transaction can request one or a list of given mobile numbers (in GSM a MSISDN or IMSI). The server will provide a response to the request based on the configured security permissions for the ASP logical interface, the availability of the consumer, providing a result code for each individual mobile number in the list. The interface will allow the ASP un-subscribe for notifications of a single or multiple consumers in the request transaction. The server will respond providing result codes for each individual consumer in the list. FIG. 11 sets out details of the information flow, as described in more detail below.

Notification Rules and Subscriptions

A server notification rules manager in the kernel 10 defines how and when a notification message or series of notification messages are delivered, to which application provider/service provider they are delivered, and what information is conveyed. The rules can even provide notification messages to a consumer's handset to prompt them to respond, for example sending an SMS message to the consumer to confirm that this new device is a permanent change, and to check if the consumer would like to be provisioned for the new services associated with this device. The SMS reply sent back by the consumer will be flagged for immediate delivery towards the server 1 so that within a few seconds of the request being sent. The server 1 can confirm the change and invoke any notifications towards the appropriate services.

A subscription manager in the kernel 10 provides the ability for applications to register to be notified automatically in the event of a handset change by a consumer. Should a mobile operator offer to expose the handset capability, presence and availability of individual consumers to external Application Service Providers (ASPs), the server 1 can be configured to specify the specific properties for exposing their presence, capability and availability, thus ensuring that they would only present information relevant to authorised applications. The subscription manager will allow notifications be forwarded for individual phone numbers (In GSM MSISDN numbers) per application type subscribed.

The subscription manager provides authentication and authorisation of the applications requesting handset capabilities for a given consumer.

Query Management

Figure 12:
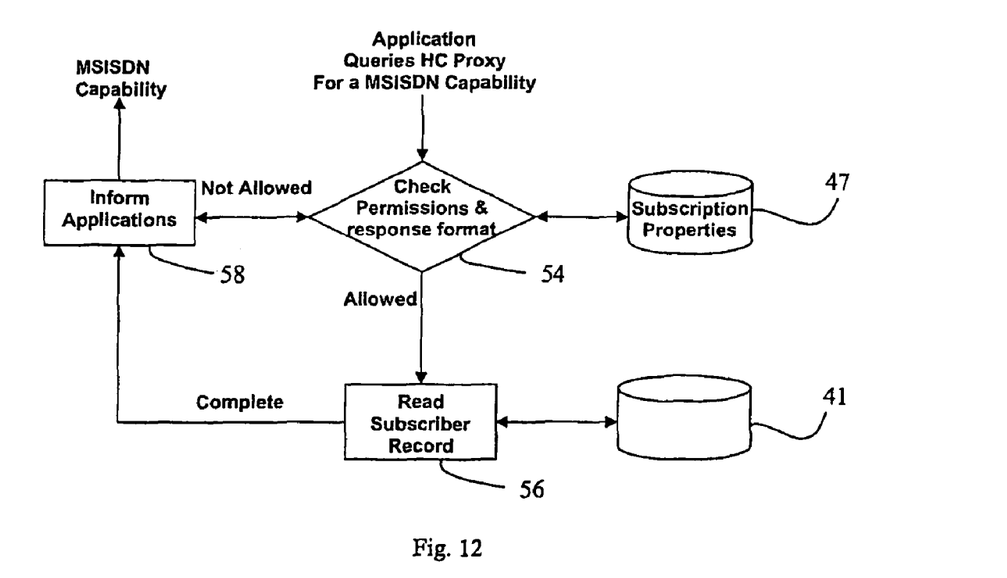
FIG. 12 is a process flow of the server, showing how the server manages queries from an external application for the current capabilities for a mobile consumer.

The server 1 performs query management on individual MSISDN numbers. This allows external applications to query the current handset capability from a given consumers MSISDN. A query request is authenticated by the subscription manager and if valid the query manager will check the server database and provide the consumers device capability information to the requesting application. In co-ordination with the subscription rules the information and format of the response is determined, and then the reply is sent back to the requesting application. FIG. 12 illustrates details of this information flow. The interface for application query is based on an open API standard.

The query interface can be used by application to determine the capabilities of handset to format a push application such as SMS ringtone/Logo appropriately.

Provisioning and Billing

The server 1 is fully configurable across either a WEB or SNMP management interface. Each kernel and event handler process provides operational status and events over an SNMP management interface or to a log file viewable via a WEB based application. Any abnormal situations can be alarmed to the operator for investigation.

Across the whole server 1 events are generated relating to usage of internal and external resources. These events are passed to a billing system for the purpose of billing settlement reconciliation with external application providers. The operator will then be able to generate interconnect charges for usage based on subscription, Individual query of a consumer and the transportation of notifications.

Server Process

Figure 3:
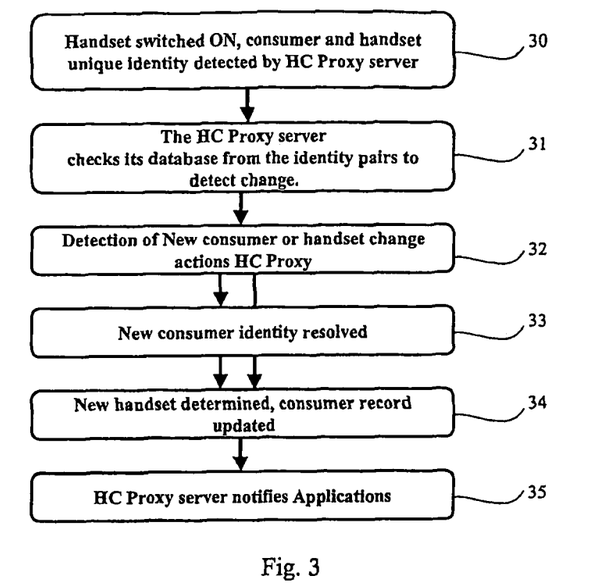
FIG. 3 is a flow diagram for operation of the server to intercept the capability of a mobile device through to the notification of change in capability to applications.

The flow diagram of FIG. 3 illustrates the procedure used by the server 1 to determine the handset capability for a given mobile device.

In step 30, the server identifies when the mobile device is switched 'ON', and it initiates an authentication procedure with the mobile network. This is the first thing that happens when a mobile device is switched on and must be completed prior to any other services being available on the mobile device.

Figure 4:
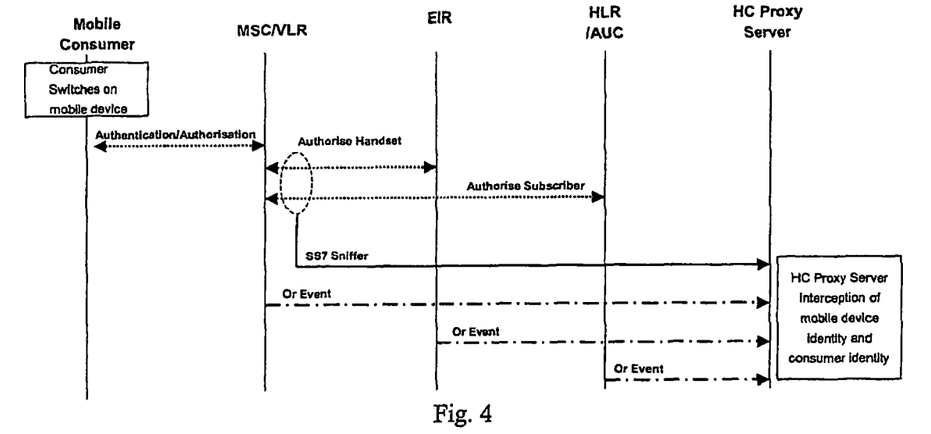
FIG. 4 is a flow diagram illustrating how the server detects consumer and handset type identities from a GSM network.

In real time the server 1 listens to the messages sent by the mobile device and the mobile network when it is switched on, as it performs an authorisation/authentication procedure. These messages can be from the SS7 signalling protocol between the MSC (Mobile switching Centre) and the EIR (Equipment Identity Register)/Equipment Register and or HLR (Home Location Register)/Authentication Server. Alternatively the messages can be directly from the Equipment Registry device or Authentication Server devices through a real time event interface indicating the authorisation/authentication of a mobile device together with the consumer identity and device identity number. The availability of the identities and processing of them is in real time. FIG. 4 illustrates details of the information flow between entities.

Examples of alternate sources of the observed consumer identities with the device identity events are given in FIGS. 5, 6, 7, and 8.

Referring again to FIG. 3, in step 31, the server 1 will immediately process these events of the mobile consumer identity number and the devices equipment Serial number identity to determine the make, model, and capability of the device. One of two procedures will occur at this point.

In step 32, if this consumer's mobile number is already present in the database but has a new device Equipment Serial Number value, then a new additional record is created for this consumer number. The result of a new record being generated for a consumer number will immediately invoke the server 1 to establish the capabilities of the new device for the given mobile number.

In step 33, if the consumer's mobile phone number is new to the server, then a new record is created for this mobile number. If the mobile telephone number (MSISDN) identity of the consumer has to be resolved from an external database the server will perform this.

In step 34, the server 1 is provisioned with a list of manufacturer device capabilities for each handset type. The device Equipment Serial Number of a mobile device includes two specific values important to the determination of the handset type, (A) the first value indicates the manufacturer, (B) the second value indicates the model code. Based on the device Equipment Serial Number provided, the server will determine the device capabilities for a manufacturer and model type. Based on the manufacturer and model, the server 1 will populate the database record for the given consumer mobile phone number with both the text values for the manufacturer/model for example a model including the feature capabilities and properties technical of the handset such as colour screen 150×90 pixels, and MMS, GPRS.

In step 35, once the new record has been created successfully inside the server database, the server will examine the notification rules and will automatically notify any pre-registered application of (A) the consumer mobile number, (B) the new device type and capabilities. The information presented in the notification message can be configured by the server to include all capability details, or only a subset for example colour display, 150×90 pixels. These details in the notification can be different for each registered application. Again this procedure occurs in real time so that applications have knowledge of the change instantaneously the new handset is switched on.

Device and Consumer Identity Detection

The server 1 collects the data from the mobile network and it uses this data to identify when a mobile consumer has changed device and subsequently may have different capabilities with the new device. The server 1 continuously collects data from the mobile network in real time to identify changes in device usage from the presence of both the consumer identity and the device identity as soon as it is activated. When the mobile device is switched 'ON', the handset will initiate an authentication procedure with the mobile network, this being standard procedure to authenticate and register the mobile device onto the mobile operator network. This is the first thing that happens when a device is switched on and must be completed prior to any other services being available to a mobile. During this procedure the mobile device will present three possible identities, (A) the mobile Phone Number (in the case of GSM the MSISDN, (B) the mobile device Equipment Serial Number (in the case of GSM this is the IMEI number and where a SIM card is used (C) the SIM Card identity (in the case of GSM this is the IMSI).

The server 1 can obtain these identities through different methods. Examples of these methods are described with reference to FIGS. 4, 5, 6, 7, and 8.

Referring to FIG. 4, the server 1 connects to the SS7 signalling network to listen to signalling information sent and received between the mobile device, the MSC and the EIR and HLR during the authentication/registration procedure when the mobile device is switched on. Based on the Mobile Phone Identity (in the case of GSM the MSISDN or IMSI) the Mobile Handset Unique manufacturer serial number (in the case of GSM the IMEI. In the case of other networks the ESN.) is captured, and recorded.

Figure 5:
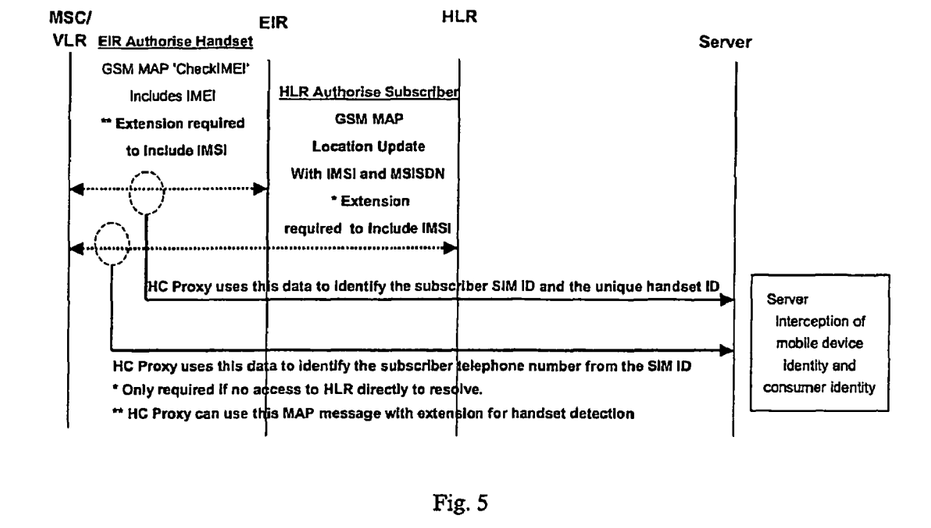
FIG. 5 is a message transfer diagram showing extensions to the GSM MAP messages used by the server to determine handset change.

Referring to FIG. 5, the server 1 observes the identities of the device and the consumer when the device is switched on and the authentication process of the mobile device with the network occurs over the signalling system 7 interfaces. In GSM these messages are transferred using MAP (Mobile application Part) protocol.

To enable the server 1 make a connection between the device identity and the consumer identity, both the device and the consumer identities need to exist in one single MAP message. As the standard GSM MAP 'CheckIMEI' message conveys only the device identity, The MAP 'CheckIMEI' message is extended to include the consumer identity. Also the standard GSM MAP 'LocationUpdate' massage only contains the consumer identity. The MAP 'LocationUpdate' message is extended in a non GSM standard way, to include the device identity.

Figure 6:
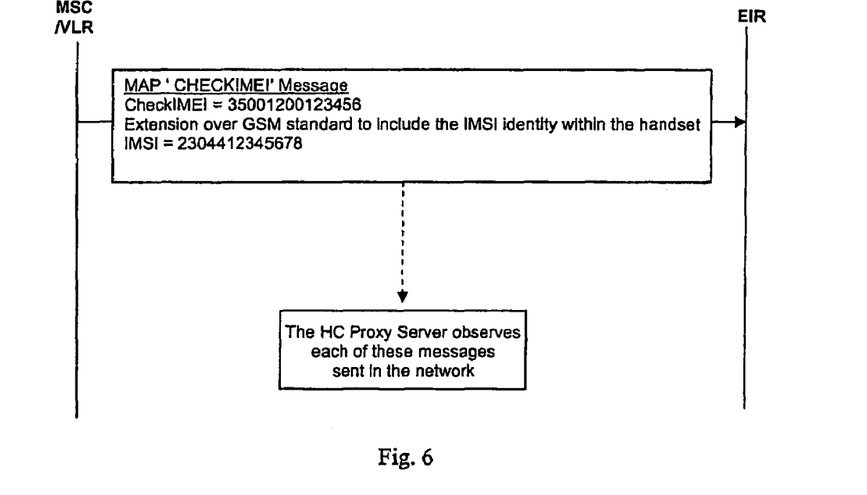
FIG. 6 shows an example of the extended GSM MAP 'Check IMEI' message.

Referring to FIG. 6, this indicates the extensions used on the GSM MAP 'CheckIMEI' message so the relationship can be made between the handset IMEI and the consumer identify. In this example the SIM (IMSI) identity is sent with the IMEI.

Figure 7:
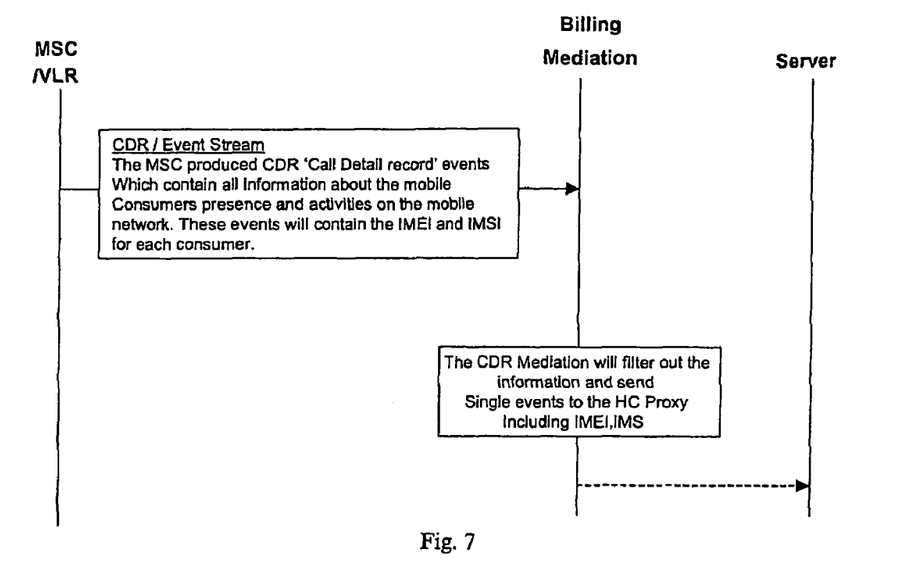
FIG. 7 shows the use of CDR 'Call Detail record' event data by the server to determine handset change.

Referring to FIG. 7, the server 1 connects directly to a billing mediation device, where the CDR 'Call Detail Record' events sent by the MSC (Mobile Switching Centre) for billing purposes are listened to by the server to observe the consumer and device identities. The MSC generates these CDR's events containing very detailed information with respect to usage of and device connecting through it. The mobility management CDRs will contain the customer identity and device identity in a single record. The billing mediation devices are used to groom the data appropriate for billing. In this case the billing mediation can groom the relevant CDR events to be sent to the HC proxy server for detecting device changes.

Figure 8:
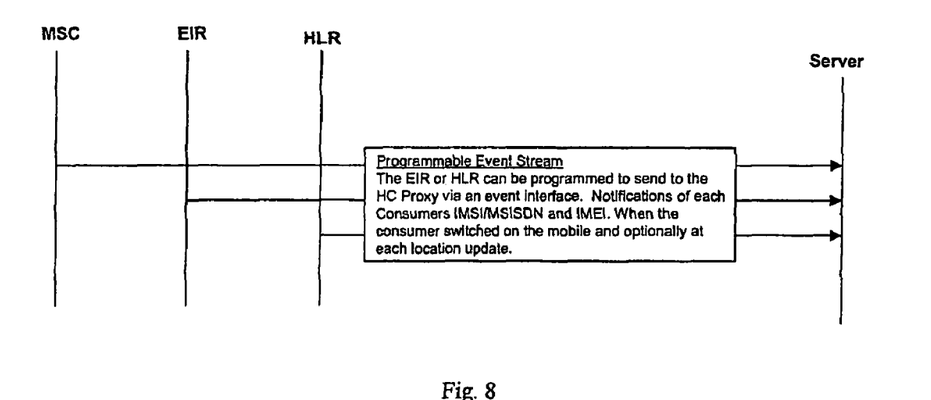
FIG. 8 shows the use of event feeds directly from a GSM MSC, EIR or HLR by the server to determine handset change.

Referring to FIG. 8, the server 1 can be connected directly with a MSC (Mobile Switching Centre), EIR (Equipment Identity Register) and/or HLR (Home Location Register) capable of passing programmable API (application programmable Interface) events in real time to the server 1. These API events include the mobile number (MSISDN or IMSI) and the equipment serial number (In GSM the IMEI. In the case of other networks the ESN.) values for the device being authenticated.

Some mobile devices have the ability to download additional feature applications onto the device for the support of WAP, MMS, or media streaming applications. The server 1 can detect the presence and use of downloadable features or mobile applications, i.e. video streaming application services. The server 1 is able to identify the download of these additional capabilities onto the mobile device, outside of the basic device features. When these new feature capabilities are identified, the server 1 can notify subscribed applications that the consumer now has additional features.

Figure 9:
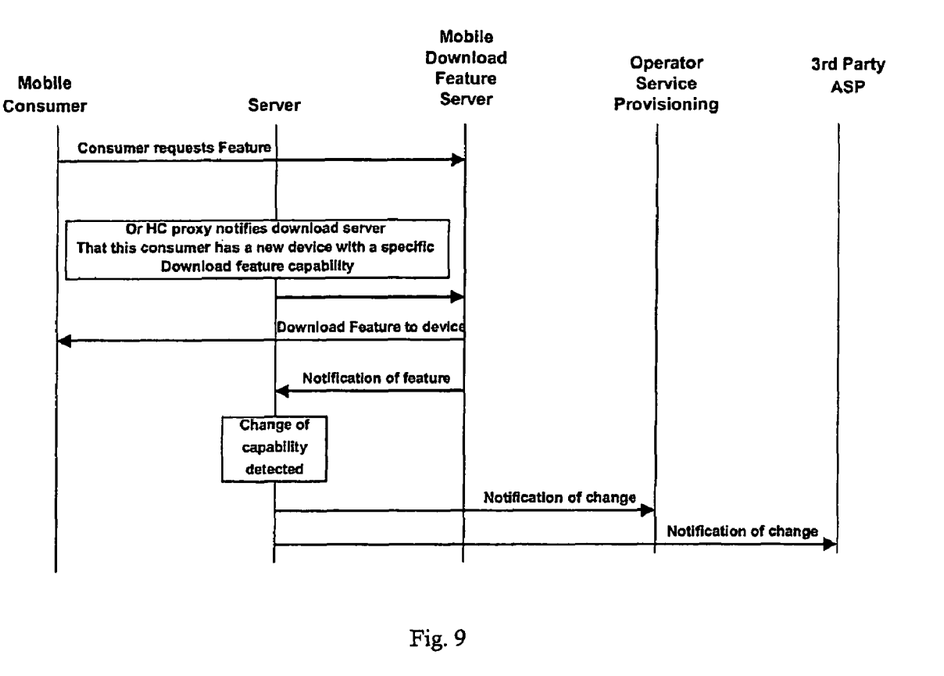
FIG. 9 is a flow diagram illustrating how the server detects downloadable features introducing new capabilities onto a consumer handset.

Referring to FIG. 9, the server 1 connects directly with download servers to recognise the usage of mobile applications, and applets loaded onto a consumer's device. These servers will send via a programmable API (application programmable interface), events in real time to the server 1 when the download of the application to the device was successful. These API events will include the mobile number (MSISDN) and details of the downloaded application onto the mobile device. Examples of these applications are video streaming applications, multi-media players and device software version updates. These additional capabilities outside of the basic manufacturer's features are recorded to the consumer's record in the server's database.

Figure 10:
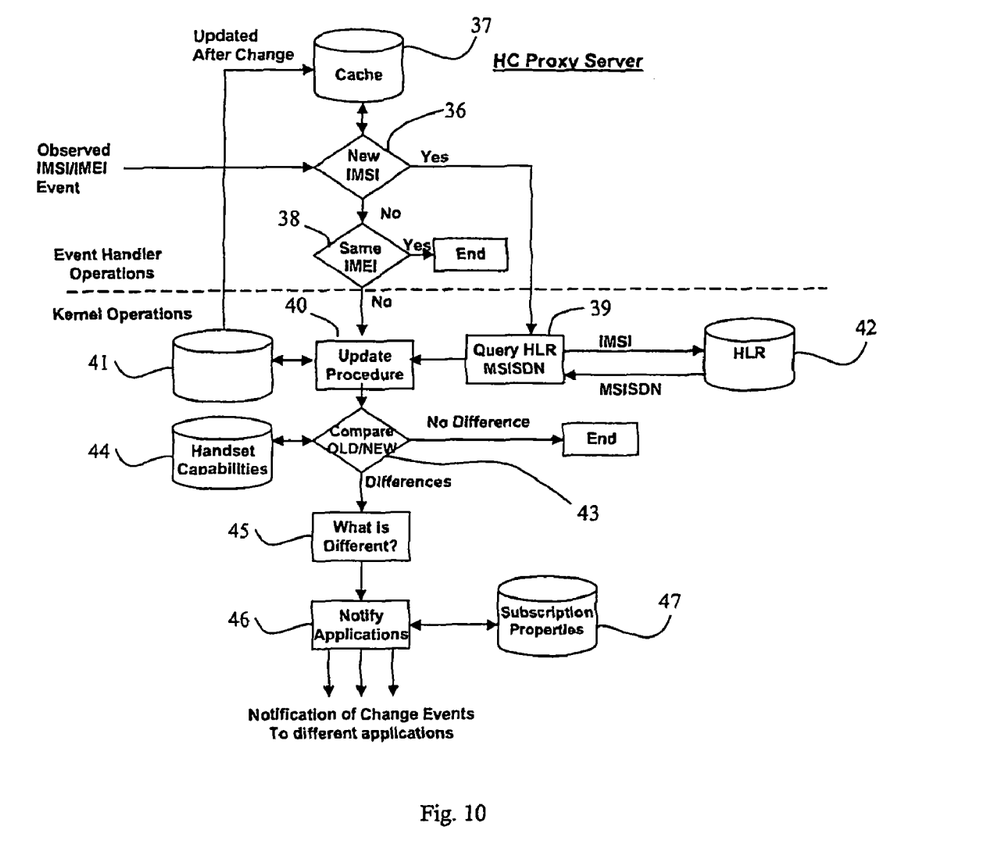
FIG. 10 is a process flow diagram showing how the server manages flow of information from an observer handset change event, identification of change, updating the consumer record, and the notification towards external systems.

Referring to FIG. 10, the process flow of through the server 1 when used in GSM, from interception of an event containing the device identity with the customer identity and how it is managed through the server. The division between kernel 10 operations and event handler 25, 26 operations is shown by interrupted lines.

In a step 36, the event handler checks in the cache 37 for existence of the consumer and if the handset has changed. If the consumer IMSI identity is new (not present in cache 37), then the server 1 sends a request in step 39 to collect the details of this consumer from an external database 42. The consumer telephone number (MSISDN) is resolved from the given IMSI by the server 1. The step 39 sends these two identities together with the device identity to an update process 40 within the kernel 10.

If the consumer IMSI identity is present in the cache 37 the event handler will check in step 38 if the handset identity for this consumer is the same. If the device identity is the same, then the server 1 will not proceed from 38 with any actions.

If in 38 the consumer IMSI identity is present but the device identity is different to that stored for this consumer identity, then the server 1 will initiate an update process 40.

The update process 40 will collect all the historical data from the kernel's "consumer database" 41 for the consumer identity and record the new identities observed. The server 1 compares in step 42 the old and the new device capabilities by comparing the list of capabilities recorded in the device "handset database" 44. The differences in capabilities will be identified in step 45. The list of additional and/or removed capabilities will be sent to the notification process 46. Based on the logic and the subscription properties listed in a subscription database 47, the process 46 will notify each individual application about the capability changes.

Referring to FIG. 11, this illustrates the process flow of the kernel 10 for an external application to subscribe to the server 1 to receive notification of the changes in capability for a given consumer's telephone number (In GSM this is MSISDN).

The step 48 receives requests from an external application to subscribe for notifications for a consumer identity. The step 48 will first check the permissions for this application in the subscription database 47, to check if the request is allowed for this application.

If in step 48 the request is not valid the kernel 10 informs a process 53 of the error code. The process 53 notifies the requesting application that this request was declined.

If the request is valid, then the kernel 10 notifies an update subscription process 50 to update the subscription database 47 so that this application is recorded to receive the notification data allowed (as detailed in FIG. 10. process 46). After Step 50 the application database is updated successfully. Then step 50 will notify a process 51 to update the consumer record (the identity in the request) that this application must be notified if the capabilities for this consumer change. The process 51 will make an entry in the consumer database 41 on the application identity to be notified.

When the consumer record has been updated then process 51 will send a response code to the inform process 53, which will notify the requesting application that this request was successful.

Referring to FIG. 12, this illustrates the process flow of the kernel 10 for an external application to query to the server 1 the current capability for a given consumer telephone number (GSM this is MSISDN).

The server 1 receives requests in step 54 from an external application to subscribe for notifications for a consumer identity. The step 54 will first check the permissions for this application in the subscription database 47, to see if the request is allowed for this application.

If the request is not valid then the kernel 10 informs a process 58 of the error code and the process 58 notifies the requesting application that this request was declined.

If the request is valid, then the kernel 10 will notify the consumer record process 56 to get the current capabilities for the consumer identity in the consumer database 41. The capabilities of the consumer are passed to the inform process 58, which will respond back to the requesting application.

With SIM-based mobile devices operators can issue multiple SIM cards having individual identities, which share the same mobile telephone number. This will enable the consumer have more than one handset with its own SIM inside. In this situation it can be possible for two SIMs to be in mobile devices with different capabilities i.e. one SIM and a car phone and another SIM in a PDA. Even though these SIM cards are not exchanged between mobile devices, the HC proxy server 1 can detect the device capabilities for each SIM identity. As each device is switched on and authenticated with the network, the server 1 will identify the capabilities for each SIM identity. If any differences exist between device capabilities between the multiple SIM cards, the server 1 will notify the subscribed application of the capability changes as the normal process.

Figure 13:
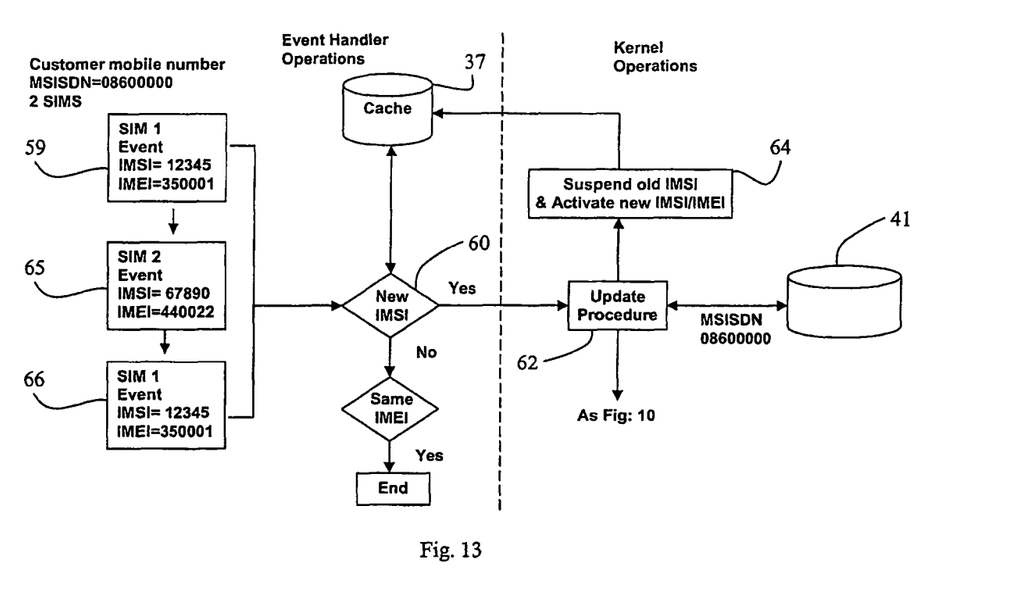
FIG. 13 is a process flow of the server operation, showing how the server manages dual SIM cards issued for the same mobile telephone number.

Referring to FIG. 13, this illustrates the process flow through the server 1 when used in GSM, for management of dual SIM cards issued for the same mobile number. The division between kernel 10 operations and event handler 25, 26 operations is shown by interrupted lines. In this example the server 1 processes the first SIM card in a first handset event 59. A process 60 of the event handler checks against the identities in this event against the cache 37. As the device or SIM is the same as that in the cache 37 no actions take place. The second device is activated with the second SIM, and this is recognised as an event 65, which is processed in step 60. The step 60 will check these identities against the identities in this event against 61. In this case the customer IMSI is not active and so the step 60 informs an update process 62. The update process 62 will check the consumer record in 41 and will recognise that this is a second SIM for the same telephone number. The update process 62 will inform the cache 37 to implement a step 64 to suspend the current active SIM (IMSI 12345) and to activate the SIM (IMSI 67890) in the cache 37. The process 62 will proceed to notify applications of changes as also described with reference to FIG. 10. The first SIM is re-activated with the first device 66 and processed by the step 60. Step 60 checks the identities in the cache 37 and will see that this IMSI is not active. The step 60 will inform the update process 62 and as with the second SIM will update the database 41 and the cache 37 and notifies the applications as in FIG. 10.

The server 1 is configured with logic rules to automatically notify applications upon a device type change. These logic rules define which applications should be notified of changes in capabilities, when the server 1 should notify an application of capability changes, how they should be notified and with what information should be sent in the notification. Examples of how the logic rules can be applied to real applications are:

- Customer care telemarketing, can be informed only when a new device is used by a consumer that has not changed device in over 1 year.
- Automated provisioning systems, GPRS, MMS, WAP, will always be informed when a device is changed. Each system will only receive the information about capabilities, which relate to their service.
- Automated direct marketing of services, GPRS, MMS, WAP based applications, if a consumer changes capability to enable one of these services for the first time then a message will be sent automatically to the customer welcoming them to the new service.
- Automatic adaptation of services, when a consumer is using two devices, swapping a SIM between the two. The corresponding services can be automatically adapted as the consumer switched between them.

It is also possible for the server 1 to inform any number of subscribed applications from ASPs (application service providers) or mobile operator services, that the consumer is now available and can now receive content and if applicable in a new format, based on the capability properties of the new device type, i.e. the ASP can be informed that a consumer subscription for stock notifications is now MMS (Multimedia) including graphs and not SMS text only. This will allow full graphical displays to be sent to this device.

Mobile marketing messages can be further personalised with content from external servers that is dynamically generated and unique to the consumer who is to receive the message. Before a marketing message is to be pushed to the consumer, the content server can query the server 1 to determine the capabilities of the device prior to formatting the content, this dynamic content can be included such as a unique bar code or otherwise personalized graphic element formatted correctly to enable it be displayed on the consumers device.

This server 1 also eliminates the need for consumers to provision mobile device types. For example, if a user switches to a water proof handset at the weekend for water sports use, these changes can be picked up dynamically and fed back in real time to the server 1. This ensures that consumers receive the optimal content type relevant to their handset capabilities in real time without any user intervention.

The server automatically detects any changes in mobile devices by a user and will automatically expedite events to systems for the purpose of automatic provisioning of any network services compatible with the new device and OTA (over the air) provisioning/configuration of the new handset so that the consumer can access the addition service capabilities of this device i.e. WAP, GPRS, MMS.

The server 1 is able to detect a consumer using the same handsets (more than one) over a period of time. The server detects this by maintaining a history of mobile device identities for each consumer. When the server detects that the same set of device identities are being used by the consumer, the server will inform the subscribed systems, services, applications to adapt the service appropriate to the capabilities of the current mobile device being used. The notification to the external systems to adapt the service for this consumer can be in the form of specific parameters or notification to suspending or enabling the corresponding service.

The server 1 overcomes issues of dual handset/device usage and/or handset replacement, by being able to provide real time notification to provisioning and applications of the current consumer device capabilities.

The server will furnish any requesting system, service, application or ASP with real time information of the current device capabilities for a given Mobile telephone number (in the case of GSM the MSISDN number).

The server can determine the capabilities for any mobile device, which is roaming into the network by determining at authentication the identity and the capabilities of the roaming mobile device. When the server detects a roaming device, it will set up a temporary record in the database for the period that the device is active in the network. The server will notify external applications that this mobile identity is temporary and is roaming from another network. This feature can be used to offer local network service or applications to the roaming mobile for a temporary period. Also it will enable the local services in the correct format i.e. a welcome message by SMS, MMS, or video.

The notification rules of the HC proxy server 1 can be configured to restrict the level of information conveyed in individual notifications of capabilities change to each external system, based on a subscription profile for the requesting system.

The server 1 can profile the movements of each individual mobile device on the mobile network identified (by the unique identity of the device) between individual mobile consumers (identified by their mobile number) for the purpose of fraud detection. It maintains a device movement database for each device change to allow alarms to be generated when an individual device movement pattern is associated to fraud. If the server detects a pattern consistent with fraud, it sends a notification to the mobile network HLR to carry out an implicit detach of the mobile device. The notification will disconnect this device from the network. The server 1 also notifies the HLR to block this consumer from connecting to the network again. The server may also be programmed to track other patterns as required by the network operator and/or the user.

The server 1 keeps a constant profile of all mobile devices on the network. This data can be used by a mobile device software update service, which sends software patches/updates to mobile devices. These software updates will be registered in the server 1 database for each device. Therefore if a device is observed on the server 1 which has not received the software update, the software update service can be informed to send this update to this device.

The real time information provided by the server 1 allows the network operator to dynamically and positively react to customer trends and behaviours from mobile device change by:
increased speed of access to new services,
service offering fully compatible with every customers capability, of active device,
increasing revenues from service usage,
reducing cost of ownership, and
improving customer satisfaction.

The network operator will benefit from the invention through immediate service enabling, maximising content richness and reduced costs from customer care when:
a mobile device is upgraded by a consumer,
a mobile device is temporarily upgraded,
there is dual device usage by a consumer, or
an unknown consumer is roaming into the network.

Other immediate benefits from this critical real-time information are:
automated provisioning of the mobile operator systems for GPRS, MMS, WAP, with OTA to handset,
the operator's customer care, eradication of manual service enabling,
push/Event content applications ringtones, MMS, information services, in the optimal and correct format
premium content providers, direct marketing and mobile games/applications.

The server 1 can also inform applications that a consumer is available to receive content in a new more suitable format, to best exploit the properties of the new mobile device.

The invention is not limited to the embodiments described but may be varied in construction and detail.

The invention claimed is:

1. A mobile device capability server comprising:
a hardware component, said hardware component being configured to non-intrusively observe authentication and registration information exchanged between the mobile device and the network prior to said mobile device having access to network services provided by plural application servers, said authentication and registration information not being destined for, nor originating from, said capability server, said hardware component being configured for automatically identifying device capabilities,
wherein the hardware component automatically notifies plural applications on said plural application servers of changes in device capabilities associated with a mobile device being used by a particular user, and wherein said hardware component, prior to automatically notifying said plural applications, transmits a message to said mobile device and receives a response from said mobile device indicating whether said changes in device capabilities are permanent,
wherein if said response indicates that said changes in device capabilities are permanent, said plural application servers adjust content or format of data presented to said device, and wherein if said response indicates that said changes in device capabilities are not permanent, said plural application servers are not notified of the changes in device capabilities, and
a list of plural applications or servers registered in advance, wherein said notification messages are customized by application or application server with respect to a subset of specific device capabilities of said device capabilities associated with said device, such that said subset of specific device capabilities are sent to a particular application, and wherein each application server is registered and a registration corresponding to each application server includes specific set of corresponding device capabilities that are to be sent to said application server by said capability server.

2. The server as claimed in claim 1, wherein said applications adapt the content or format of data to be sent to said device upon receipt of said notification messages.

3. The server as claimed in claim 1, wherein SS7 or other out of band signaling information is non-intrusively observed.

4. The server as claimed in claim 1, wherein said hardware component being configured to, prior to said plural application servers adjusting, automatically transmit a message to said mobile device to request further information from said mobile device, to receive such further information, and to provide such further information to at least one application server, and wherein said at least one application server uses said information to implement said adjustment.

5. The server as claimed in claim 1, wherein said server and said application servers are configured such that just prior to said application servers pushing any content to said mobile device, said application servers are provided with real time device capability data.

6. A method for use in mobile device capability server comprising:
storing a list of plural applications or application servers that have registered in advance,
non-intrusively observing, in a hardware component, authentication and registration information exchanged between a mobile device and a network prior to said mobile device having access to network services provided by said plural application servers, said authentication and registration information not being destined for, nor originating from, said capability server;
automatically identifying device capabilities in response to said observing;
transmitting a message to said mobile device and receiving a response from said mobile device, said response indicating whether said changes in device capabilities are permanent;
if said response indicates changes in said device capabilities are permanent, automatically notifying plural applications on said plural application servers of changes in device capabilities associated with a mobile device being used by a particular user to cause said plural application servers to adjust content or format of data presented to said device, and if said response indicates that said changes in device capabilities are not permanent, not notifying said plural application servers of said changes in said device capabilities; and
customizing said notification messages by application or application server with respect to a subset of specific device capabilities of said device capabilities associated with said device, such that said subset of specific device capabilities are sent to a particular application, and wherein a registration corresponding to each application server on said list includes a specific set of corresponding device capabilities that are to be sent to said application server by said capability server.

7. The method of claim 6 further comprising adapting the content or format of data to be sent to said device upon receipt of said notification messages.

8. The method 6, wherein said observing includes observing SS7 or other out of band signaling.

9. The method of 6, further comprising providing said application servers with real time device capability data just prior to said application servers pushing any content to a mobile device.

* * * * *

UNITED STATES PATENT AND TRADEMARK OFFICE
CERTIFICATE OF CORRECTION

PATENT NO. : 8,099,490 B2  Page 1 of 2
APPLICATION NO. : 11/347433
DATED : January 17, 2012
INVENTOR(S) : Deakin It is certified that error appears in the above-identified patent and that said Letters Patent is hereby corrected as shown below:

Title Page, item (73), under "Assignee", in Column 1, Line 1, delete "Limited (IE)" and insert -- Limited, Ranelagh (IE) --, therefor.

In the Drawings

In Fig. 10, Sheet 6 of 8, delete " " and insert -- --, therefor.

In Fig. 11, Sheet 7 of 8, delete " " and insert -- --, therefor.

In Fig. 12, Sheet 7 of 8, delete " " and insert -- --, therefor.

Signed and Sealed this
Twentieth Day of January, 2015

Michelle K. Lee
*Deputy Director of the United States Patent and Trademark Office*

CERTIFICATE OF CORRECTION (continued)
U.S. Pat. No. 8,099,490 B2

In Fig. 13, Sheet 8 of 8, delete "  " and insert --  --, therefor.

In the Specification

In Column 8, Line 22, delete "MSISDN," and insert -- MSISDN), -- therefor.

In Column 8, Line 24, delete "number" and insert -- number) -- therefor.

In Column 13, Line 24, delete "format" and insert -- format, -- therefor.

In the Claims

In Column 14, Line 59, in Claim 8, delete "The method 6," and insert -- The method of claim 6, --, therefor.

In Column 14, Line 61, in Claim 9, delete "The method of 6," and insert -- The method of claim 6, --, therefor.